United States Patent
Mironov et al.

(10) Patent No.: US 12,435,014 B1
(45) Date of Patent: Oct. 7, 2025

(54) PROPYLENE OLIGOMERIZATION PROCESSES WITH ENHANCED OLEFINIC YIELDS

(71) Applicant: Chevron U.S.A. Inc., San Ramon, CA (US)

(72) Inventors: Oleg A. Mironov, Kensington, CA (US); Sven Ivar Hommeltoft, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 19/061,498

(22) Filed: Feb. 24, 2025

(51) Int. Cl.
- *C07C 2/34* (2006.01)
- *C07C 2/54* (2006.01)
- *C07C 2/56* (2006.01)
- *C07C 2/58* (2006.01)
- *C07C 2/60* (2006.01)

(52) U.S. Cl.
CPC .......... *C07C 2/34* (2013.01); *C07C 2/60* (2013.01); *C07C 2/54* (2013.01); *C07C 2/56* (2013.01); *C07C 2/58* (2013.01)

(58) Field of Classification Search
CPC .... C07C 2/34; C07C 2/60; C07C 2/54; C07C 2/56; C07C 2/58
See application file for complete search history.

(56) References Cited

U.S. PATENT DOCUMENTS

| | | | | |
|---|---|---|---|---|
| 3,009,972 A | * | 11/1961 | Johnson | C07C 2/26 568/7 |
| 4,252,987 A | * | 2/1981 | Goodall | B01J 31/0237 585/513 |
| 5,059,739 A | * | 10/1991 | Hendriksen | B01J 31/143 585/521 |
| 5,321,189 A | * | 6/1994 | Mueller | C07C 2/34 585/512 |
| 2003/0181775 A1 | * | 9/2003 | Lecocq | B01J 31/143 502/103 |

OTHER PUBLICATIONS

Escola et al. (Ind. Eng. Chem. Res. 2006, 45, 7409-7414, "Liquid-Phase Oligomerization of 1-Hexene Using Al-MTS Catalysts") (Year: 2006).*
Coxon et al. (ACS Catal. 2016, 6, 3008-3016, "Efficient 1-Hexene Trimerization with Triazacyclohexane Chromium Catalysts and Detailed Product Analysis by 13 C NMR") (Year: 2016).*
Hikmet et al. (Journal of Advances in Chemistry, vol. 14 No. 1, Dec. 2017, "Investigation the Oligomerization Process of HEXENE-1") (Year: 2017).*

* cited by examiner

*Primary Examiner* — Ali Z Fadhel
(74) *Attorney, Agent, or Firm* — HUNTON ANDREWS KURTH LLP (57) ABSTRACT

In one embodiment the application pertains to a process which provides longer chain and less isomerized (more linear molecules). A propylene-derived olefin mixture is reacted under suitable conditions to form a mixture of oligomers in the presence of a catalyst comprising alkyl aluminum halide complex. A suitable alkyl aluminum halide complex comprises ethyl aluminum dichloride bis(2-chloroethyl) ether complex which may be used with a tert-butyl chloride or other initiator.

12 Claims, 9 Drawing Sheets

PROPYLENE OLIGOMERIZATION PROCESSES WITH ENHANCED OLEFINIC YIELDS

FIELD OF THE DISCLOSURE

The present disclosure relates to processes and systems for increased yields of olefinic products with less shorter chain oligomers using a complex of an alkyl aluminum catalyst.

BACKGROUND AND SUMMARY

Conversion of light olefins such as propylene to liquid products and especially to chemical intermediates can significantly boost product value and provide an advantageous outlet for feed streams such as the fluid catalytic cracking (FCC) off-gas. Conventional phosphoric acid-based oligomerization technology yields highly isomerized, branched, short chain-length products (e.g., Tetramer (-C12), Pentamer (-C15)). However, what is desired are longer-chain, less isomerized (more linear) compounds. Thus, processes for making such compounds are desired. It would be further advantageous if such processes reduced the resulting amount of shorter chain oligomers without making the entire range of reaction products too heavy.

Advantageously, processes have been developed that meet one or more up to all of the aforementioned desires. In one embodiment, the instant application pertains to a process comprising first providing a propylene-derived olefin mixture to a reactor. Next, the propylene-derived olefin mixture is reacted under suitable conditions to form a mixture of oligomers in the presence of a catalyst comprising alkyl aluminum halide complex. The starting propylene-derived olefin mixture comprises propylene dimer, propylene trimer, propylene tetramer, or any mixture thereof. Advantageously, at least about 60% by weight of the total amount of propylene dimer, propylene trimer, and propylene tetramer in the starting propylene-derived olefin mixture is reacted to form the mixture of oligomers and the formed mixture of oligomers advantageously comprises propylene oligomers comprising at least 15 carbons atoms.

In another embodiment, the aforementioned process employs a catalyst comprising a catalyst concentration of at least about 0.02 M based on aluminum concentration of an ethyl aluminum dichloride bis(2-chloroethyl) ether complex and a tert-butyl chloride initiator, a reaction temperature of at least about 15° C. and the formed mixture of oligomers comprises propylene pentamers, propylene hexamers, propylene heptamers, propylene octamers, propylene nonamers, propylene decamers, or any mixture thereof.

BRIEF DESCRIPTION OF THE DRAWINGS

Various embodiments of the present disclosure, together with further objects and advantages, may best be understood by reference to the following description taken in conjunction with the accompanying drawing with a full description of each figure in the examples section below.

DETAILED DESCRIPTION

General Process

This application pertains to processes for converting shorter chain propylene-derived olefins to longer-chain products that are less isomerized than longer-chain products made in conventional processes. Generally, the process comprises feeding a starting mixture of propylene-derived olefins, e.g., $C_6$-$C_{12}$ propylene-derived olefins, to a reactor where the starting mixture is reacted in the presence of an alkyl aluminum halide complex catalyst under conditions to form a mixture of longer propylene oligomers, e.g., $C_{15}$-$C_{30}$ propylene oligomers.

Starting Propylene-Derived Olefin Mixture

The starting propylene-derived olefin mixture is not particularly critical so long as it comprises a concentration of sufficiently light propylene oligomers that are capable of being converted to heavier longer propylene oligomers. A suitable light oligomer feed may comprise a <400° F. propylene oligomer fraction comprising, for example, propylene dimer (C6), propylene trimer (C9), propylene tetramer (C12), or any mixture thereof. While the examples below employ a feed mixture of propylene dimer, propylene trimer, propylene tetramer, along with heptane and toluene solvents, it should be understood that a relatively pure feed of propylene dimer, propylene trimer, or propylene tetramer (with or without heptane, toluene, or other solvents) may be employed in the processes as well. Similarly, any combination of two or more or propylene dimer, propylene trimer, or propylene tetramer may be employed.

Catalyst and Reaction Conditions

The catalyst employed in the processes is an alkyl aluminum halide complex such as, for example, an alkyl aluminum dihalide-bis-haloalkyl ether complex. The specific alkyl aluminum halide complex employed may vary depending upon the specific starting feed, desired products, as well as specific reactor and reaction conditions. In some embodiments, the alkyl group in the alkyl aluminum halide complex or the alkyl aluminum dihalide-bis-haloalkyl ether complex comprises a $C_1$-$C_8$ alkyl group. In some embodiments, the catalyst to be employed is an ethyl aluminum dichloride bis(2-chloroethyl) ether complex such as that shown in FIG. 1.

Figure 1:
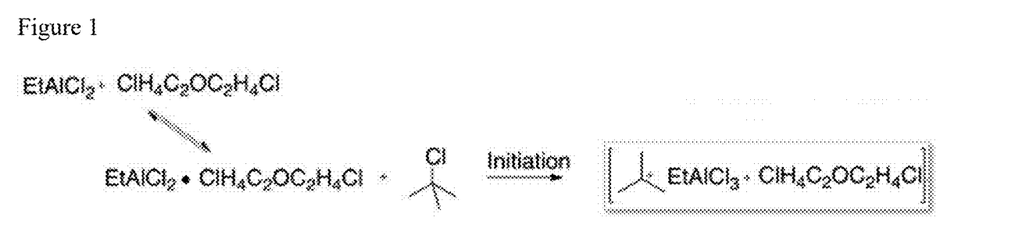
FIG. 1 shows the reaction to form a representative alkyl aluminum complex for use as a catalyst with a tert-butyl initiator.

Depending upon the catalyst employed and other factors it may be desirable in some embodiments to conduct the reaction in the presence of an oligomerization initiator in order to increase the reaction rate. The specific initiator to be employed may vary depending upon the specific catalyst, starting material, and desired product mixture. Typical oligomerization initiators may include, for example, cationic initiators such as, for example, t-butyl chloride. A representative initiating mechanism is shown in FIG. 1.

The reaction conditions employed may vary depending upon the catalyst, starting material, and desired product mixture. In some embodiments, suitable reaction conditions are selected to achieve at least about 50, or at least about 55, or at least about 60% conversion, or at least about 65% conversion or higher to propylene pentamer (C15) or higher products. In some embodiments, a catalyst concentration may be at least about 0.005 M, or at least about 0.01 M, or at least about 0.02 M up to about 0.05 M, or up to about 0.04 M, or up to about 0.03 M, based on aluminum concentration. As described above, an initiator such as t-butyl chloride may be employed with the catalyst in order to increase the rate of reaction.

The reaction temperature may vary but generally the higher the temperature the faster the reaction. In some embodiments, the reaction temperature is at least about 0° C., or at least about 10° C., at least about 15° C., or at least about 20° C., or at least about 25° C., up to about 35° C., or up to about 40° C., or up to about 50° C. or higher.

Generally, the reaction time may vary depending upon the mix of products desired, the reaction temperature employed, the concentration of the catalyst, and the desired conversion rate. Generally, longer reaction times increase conversion and increase molecular weight of the specific products in the product mixture. In one embodiment, the reaction time is conducted to achieve at least about 50, or at least about 55, or at least about 60% conversion, or at least about 65% conversion or higher. In some embodiments, the reaction time is at least about 0.25 hr, or at least about 0.5 hr., or at least about 1 hr., or at least about at least about 2 hr., or at least about 3 hr., up to about 20 hr., or up to about 10 hr, up to about 4 hr.

Products—Formed Mixture of Oligomers

While the reaction products will usually comprise a mixture of shorter and longer oligomers the specific product mixture may vary depending upon the starting ingredients and reaction conditions. Generally, the formed mixture of oligomers comprises propylene oligomers comprising at least 15 carbons atoms, e.g., propylene tetramer and higher. Such mixtures may comprise, for example, propylene pentamers, propylene hexamers, propylene heptamers, propylene octamers, propylene nonamers, propylene decamers, or any mixture thereof. The relative amounts of each of the C15 or higher oligomers present may generally be shifted to larger concentrations of heavier oligomers by, for example, employing a longer reaction time, a higher catalyst concentration, or a combination thereof.

In some embodiments, at least about 50, or at least about 55, or at least about 60, or at least about 65, or at least about 70% by weight of the total amount of propylene dimer, propylene trimer, and propylene tetramer in the propylene-derived olefin mixture is reacted to form the mixture of oligomers comprising propylene pentamers, propylene hexamers, propylene heptamers, propylene octamers, propylene nonamers, propylene decamers, or any mixture thereof.

EXAMPLES

A <400° F. product fraction comprising propylene dimers, propylene trimers, and propylene tetramers along heptane and toluene solvents with was used as the propylene-derived olefin mixture in the feed. The propylene-derived olefin mixture was reacted in the presence of a catalyst comprising an ethyl aluminum dichloride bis(2-chloroethyl) ether complex (EADC-CEE catalyst which also may be referred to as EADC here and in the figures). The reaction to form the EADC-CEE catalyst and an initiation reaction of the EADC-CEE catalyst with tert-butyl chloride is shown in FIG. 1.

The effect of temperature, catalyst concentration, and initiator was evaluated at various conditions. Specifically, reactions were conducted using the <400° F. product fraction and EADC-CEE catalyst at various reaction temperatures (0° C. and 20° C.) with various EADC-CEE catalyst concentrations (0.005 M to 0.02 M (Al-basis)) in the presence and in the absence of a tert-butyl chloride initiator.

Figure 4:
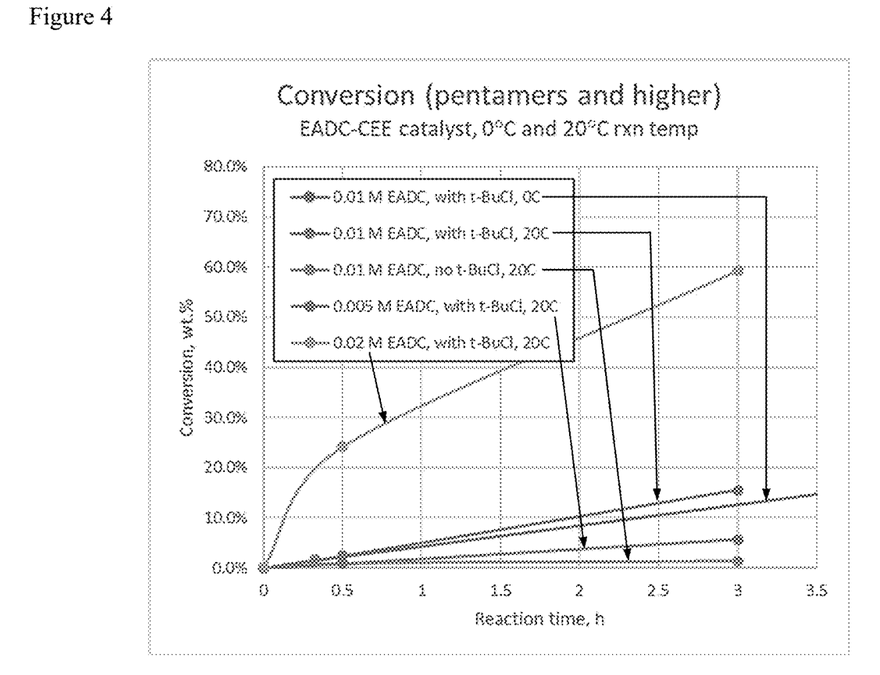
FIG. 4 shows conversion and reaction time at various concentrations of catalyst with and without an initiator at various reaction temperatures.
Figure 5:
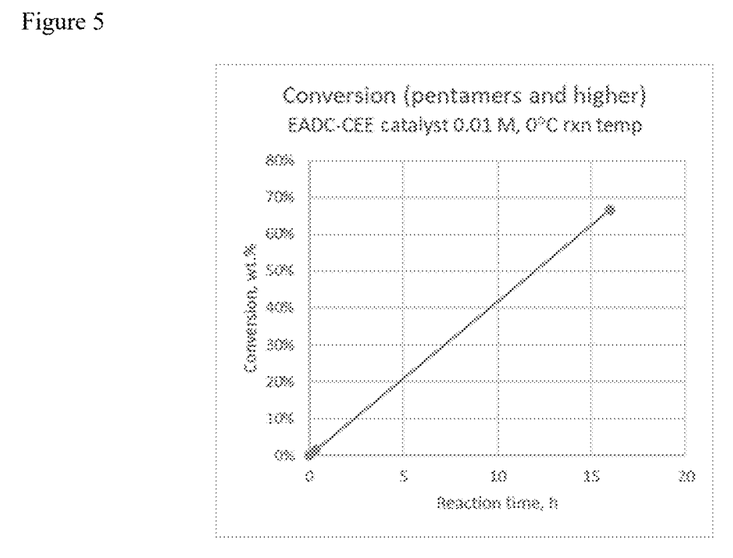
FIG. 5 shows conversion and reaction time at 0.01M concentration of catalyst at 0° C. reaction temperature.

Conversion vs. reaction time results for various parameters is shown in FIGS. 4-5. Conversion as high as 60% in 3 hours at 20° C. and 0.02 M EADC in a batch test was observed. For the lower-temperature experiment, ~70% conversion overnight at 0° C. and 0.01 M EADC was achieved. Reaction promoter (t-BuCl) was useful for the reaction initiation.

Figure 6:
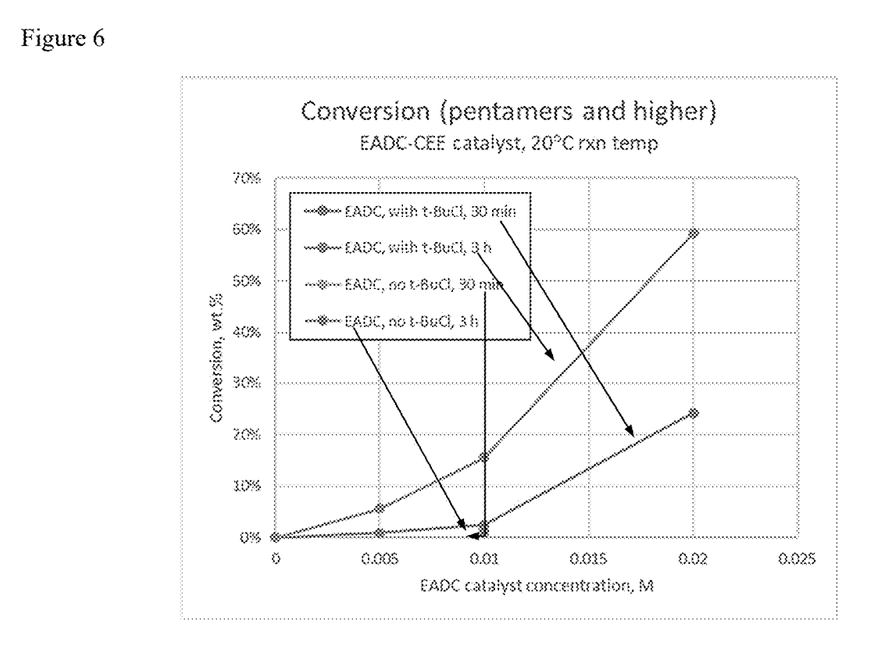
FIG. 6 shows conversion at various concentrations at 20° C. reaction temperature.
Figure 7:
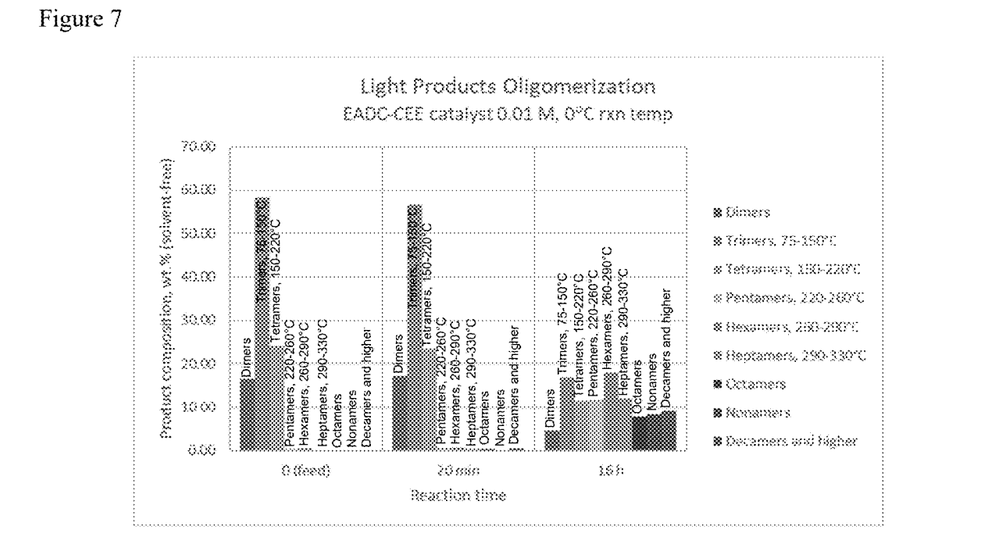
FIG. 7 shows product composition at various reaction times at 0° C. reaction temperature.
Figure 8:
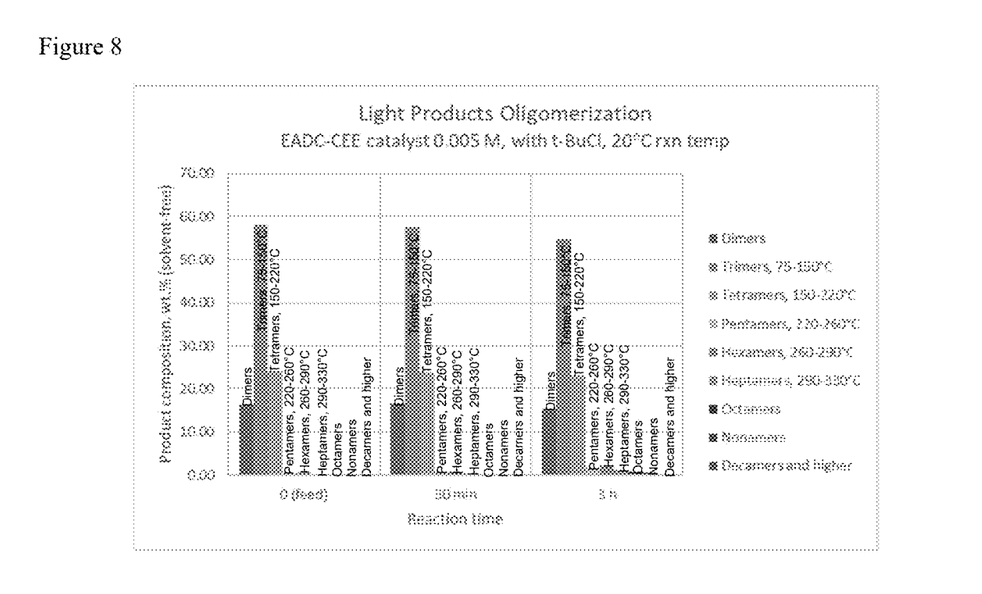
FIG. 8 shows product composition at various reaction times at 20° C. reaction temperature.
Figure 9:
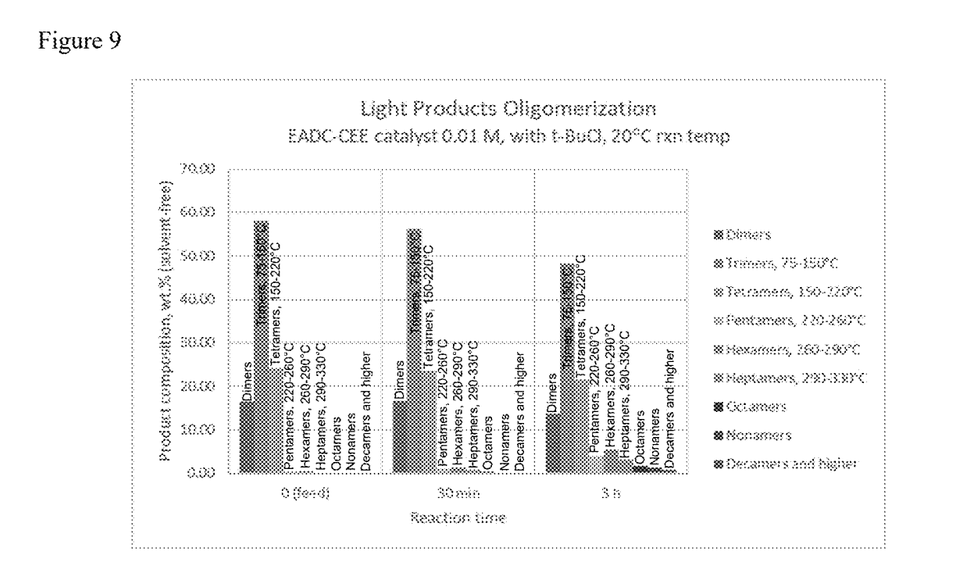
FIG. 9 shows product composition at various reaction times at 20° C. reaction temperature.
Figure 10:
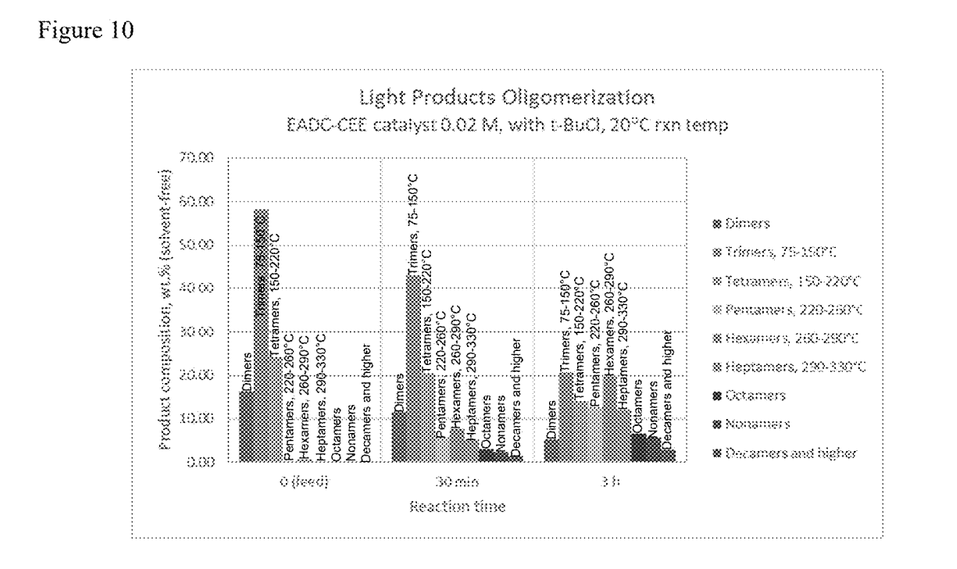
FIG. 10 shows product composition at various reaction times at 20° C. reaction temperature.
Figure 11:
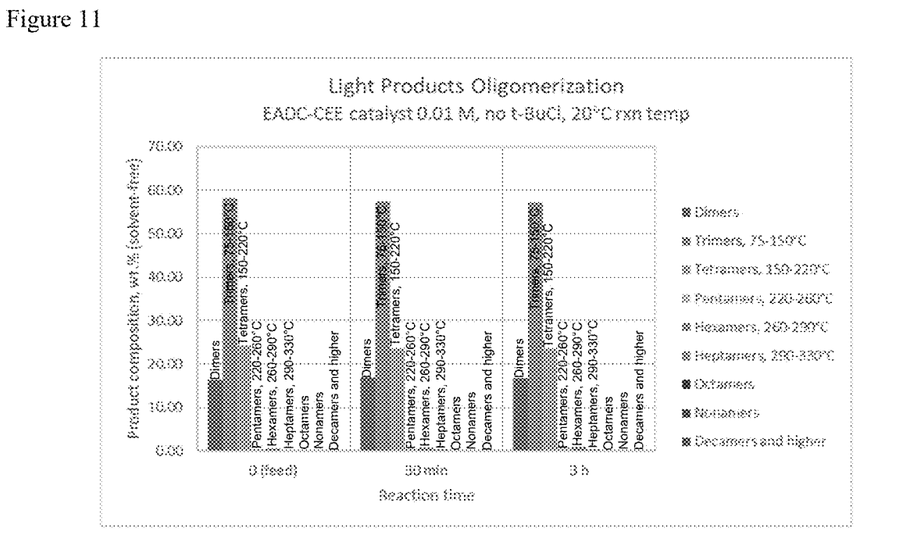
FIG. 11 shows product composition at various reaction times at 20° C. reaction temperature.

Conversion vs. catalyst concentration is shown in FIG. 6. As shown in this specific example, catalyst concentration has an effect on conversion rate. Furthermore, conversion rate in the examples appears to be non-linear vs. catalyst concentration in the 0.005-0.02 M range. Progressively higher rates are observed at higher concentrations in these specific examples.

FIGS. 7-11 show product distribution vs. catalyst concentration. While not stated on the figures Octamers (C24) are in the 330-360° C. range, Nonamers (C27) are in the 360-385° C. range, and Decamers and higher (C30+) are in the range >385° C.

Figure 12:
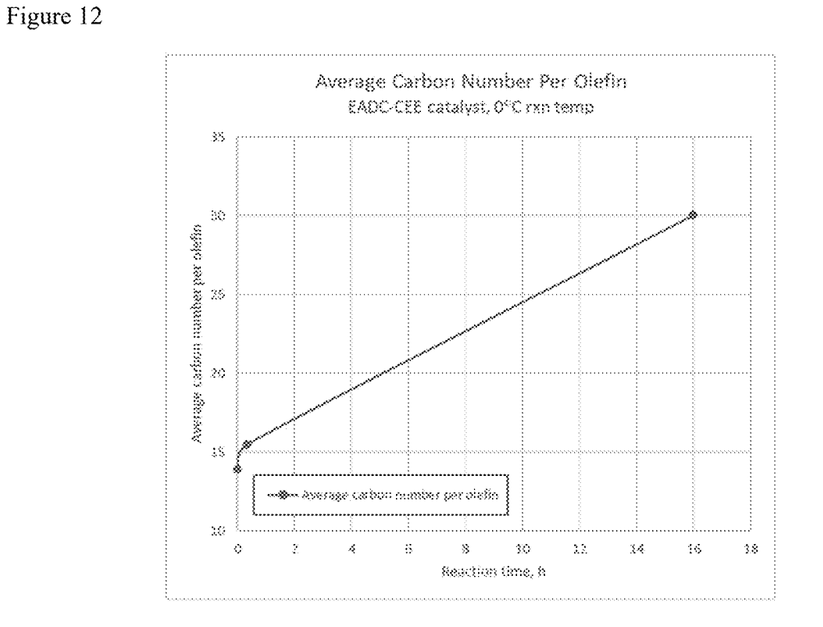
FIG. 12 shows average carbon number per olefin at various reaction times at 0° C. reaction temperature.
Figure 13:
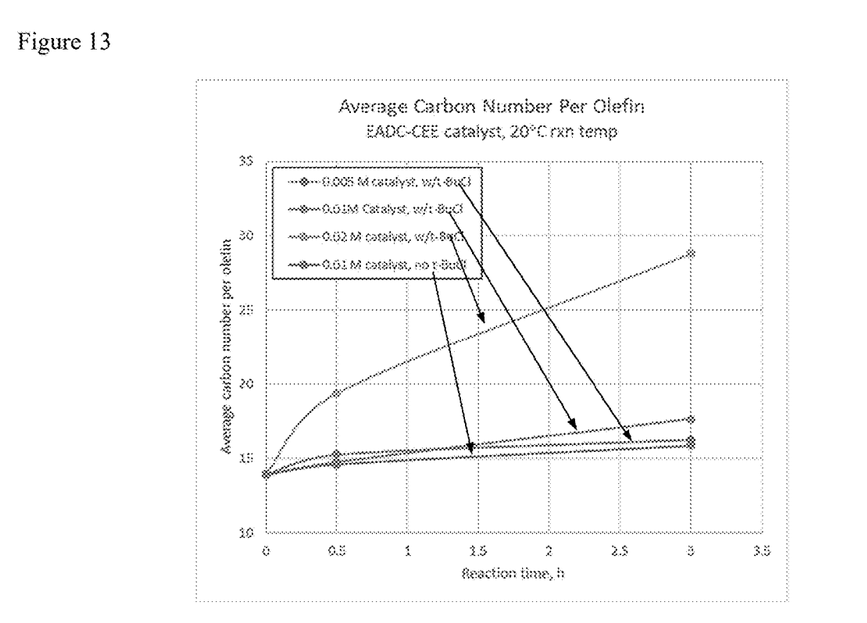
FIG. 13 shows average carbon number per olefin at various reaction times at 20° C. reaction temperature.

The reaction in the examples was shown to produce gradually longer-chain oligomers as reaction time increased. The average carbon number (by NMR) vs. reaction time for a reaction temperature of 0° C. is shown in FIG. 12. FIG. 13 shows the average carbon number (by NMR) vs. reaction time for a reaction temperature of 20° C. The reaction temperature of 20° C. generally reduces the reaction time as compared to a 0° C. reaction temperature.

Figure 14:
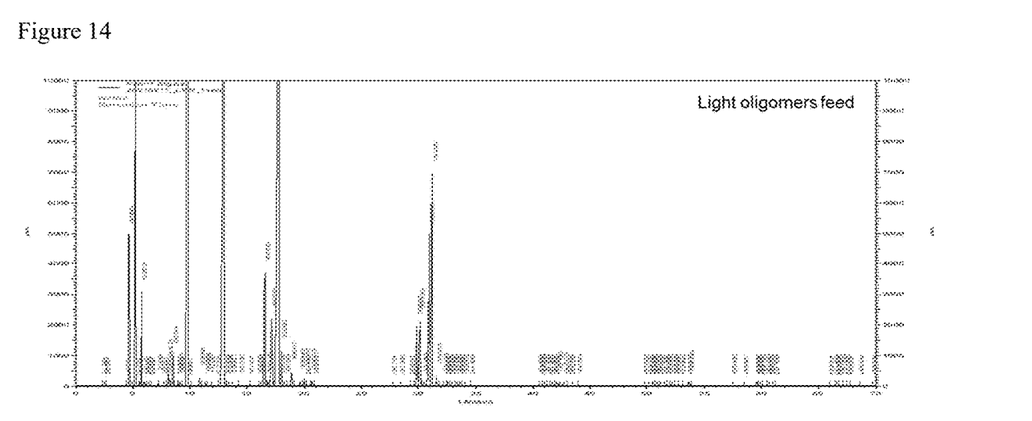
FIG. 14 shows gas chromatography results of the starting propylene-derived olefin mixture (oligomerization feed).
Figure 15:
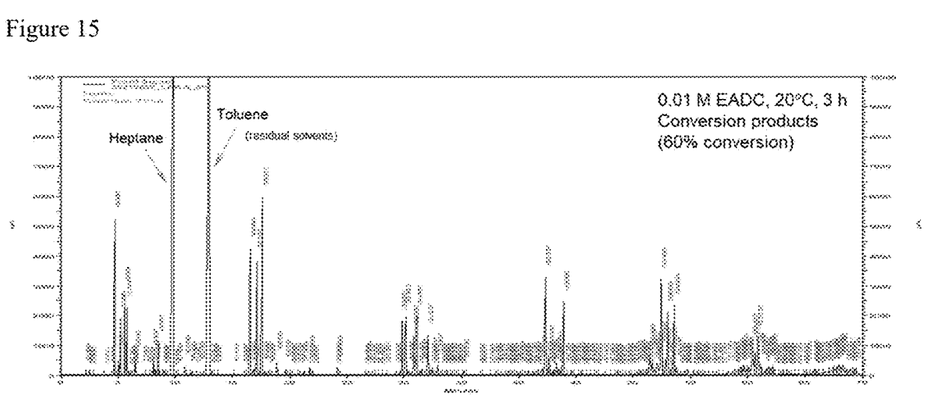
FIG. 15 shows gas chromatography results of the products.

A gas chromatogram is shown in FIG. 14 for the propylene-derived olefin mixture feed used in the examples while FIG. 15 shows a gas chromatogram of the mixture of oligomers produced (conversion products) in a 0.01 M EADC catalyst. As shown in FIG. 15, the EADC-oligomerized product (the mixture of oligomers formed) remains a relatively simple mixture of separated molecules.

Figure 16:
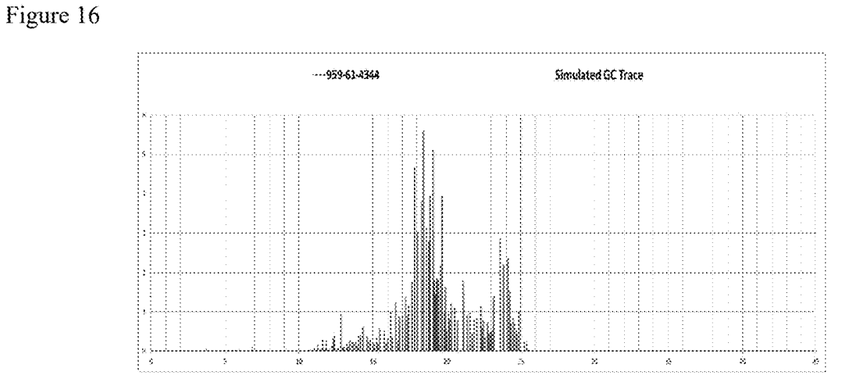
FIG. 16 shows gas chromatography results of prior art hydrogenated tetramer product.

For comparison purposes a gas chromatogram is shown in FIG. 16 of a tetramer product mix produced in a conventional prior art oligomerization without using the alkyl aluminum halide complex catalyst. As shown in FIG. 16 the prior art mixture is a complex mixture that lacks the desired heavier oligomers produced with the alkyl aluminum halide complex catalyst in the examples herein.

Figure 17:
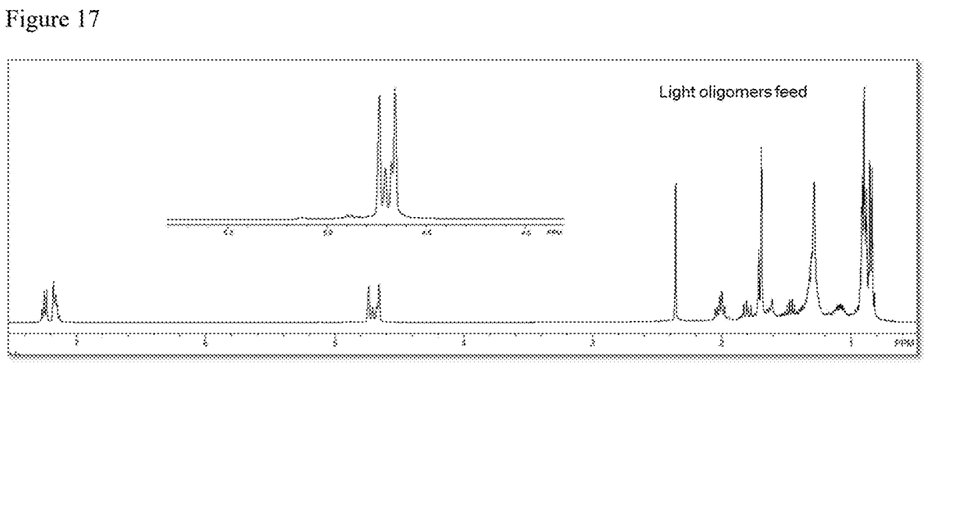
FIG. 17 shows HNMR spectra of the starting propylene-derived olefin mixture (oligomerization feed).
Figure 18:
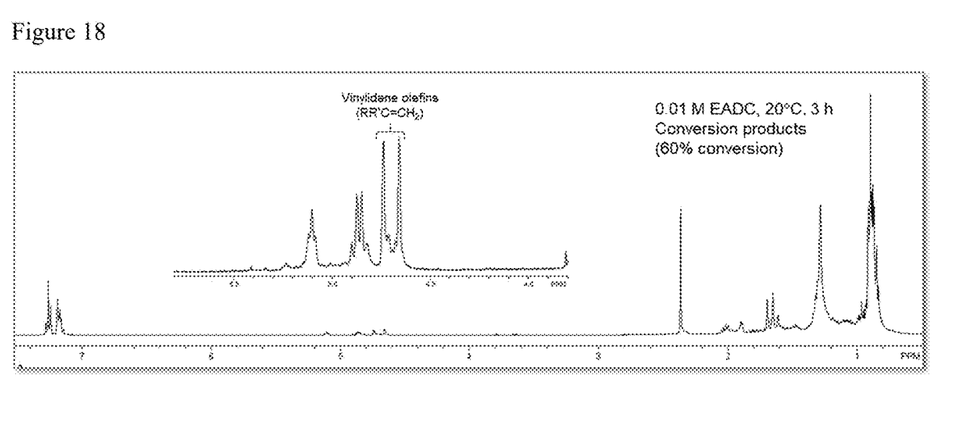
FIG. 18 shows HNMR spectra of products formed.

FIG. 17 shows an HNMR spectra of the propylene-derived olefin mixture feed (light oligomers feed). FIG. 18 shows a representative HNMR spectra of the mixture of oligomers formed (conversion products) in an EADC-catalyzed 3 hour reaction conducted with 0.01 M catalyst concentration at 20° C.

Figure 2:
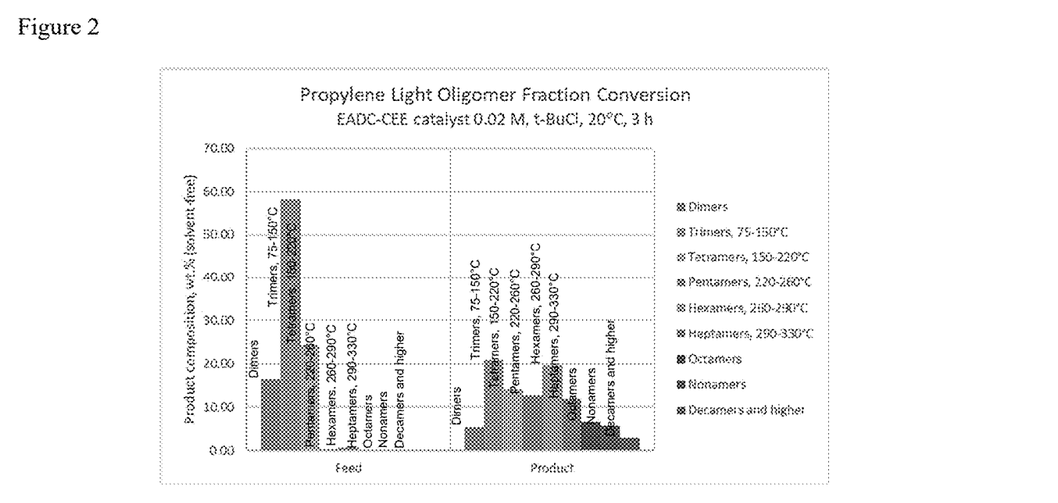
FIG. 2 shows a simulated distillation analysis of the starting propylene-derived olefin mixture (oligomerization feed) and the products.
Figure 3:
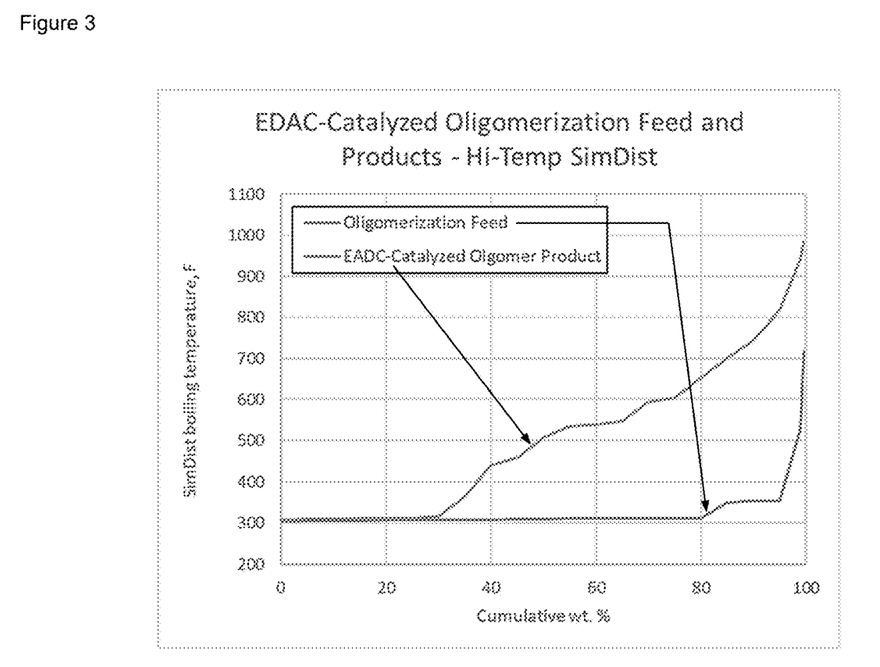
FIG. 3 shows a simulated distillation analysis of the starting propylene-derived olefin mixture (oligomerization feed) and the products by cumulative weight percent vs. boiling temperature.

A simulated distillation analysis (high-temperature) of the light oligomer feed and EADC-catalyzed oligomer product indicates that there is slightly more heavier oligomers present than measured by the general gas chromatography method reflected in the data described in FIGS. 14 and 15. Decamers and higher, >385° C. (>725° F.) measured by gas chromatography as ~4 wt. %, while the simulated distillation analysis (high-temperature) measured the >725° F. fraction as ~12 wt. %. The simulated distillation analysis (high-temperature) data is shown in FIGS. 2-3.

In sum, light oligomers conversion using alkylaluminium catalyst is successful. Reaction rates were shown to be progressively higher at higher catalyst concentrations. Vinylidene content decreases with higher conversion; however, the product remains well-defined.

Specific Embodiments

Specific embodiments are described in the numbered embodiments below.

1. A process comprising:
providing a propylene-derived olefin mixture to a reactor; and
reacting the propylene-derived olefin mixture under suitable conditions to form a mixture of oligomers in the presence of a catalyst comprising alkyl aluminum halide complex;
wherein the propylene-derived olefin mixture comprises propylene dimer, propylene trimer, propylene tetramer, or any mixture thereof and wherein at least about 60% by weight of the total amount of propylene dimer, propylene trimer, and propylene tetramer in the propylene-derived olefin mixture is reacted to form the mixture of oligomers and wherein the formed mixture of oligomers comprises propylene oligomers comprising at least 15 carbons atoms.

2. The process of embodiment 1 wherein the propylene oligomers comprising at least 15 carbons atoms comprise propylene pentamers, propylene hexamers, propylene heptamers, propylene octamers, propylene nonamers, propylene decamers, or any mixture thereof.

3. The process of embodiment 1 and/or 2 wherein the alkyl aluminum halide complex comprises a $C_1$-$C_8$ alkyl group.

4. The process of any one or more of embodiment 1-3, wherein the alkyl aluminum halide complex comprises an alkyl aluminum dihalide-bis-haloalkyl ether complex.

5. The process of any one or more of embodiments 1-4 wherein the alkyl aluminum dihalide-bis-haloalkyl ether complex comprises ethyl aluminum dichloride bis(2-chloroethyl) ether complex.

6. The process of any one or more of embodiments 1-5 which further comprises employing an oligomerization initiator.

7. The process of embodiment 6 wherein the oligomerization initiator comprises t-butyl chloride.

8. The process of any one or more of embodiments 1-7 wherein the suitable conditions comprise a catalyst concentration of at least about 0.005 M up to about 0.05 M based on aluminum concentration, the presence of an oligomerization initiator, and a temperature of at least about 0° C.

9. The process of any one or more of embodiments 1-8 wherein the temperature is at least about 10° C. and the catalyst concentration is at least about 0.02 M based on aluminum concentration, and the oligomerization initiator is tert-butyl chloride.

10. A process comprising:
providing a propylene-derived olefin mixture to a reactor; and
reacting the propylene-derived olefin mixture under suitable conditions to form a mixture of oligomers in the presence of a catalyst comprising an ethyl aluminum dichloride bis(2-chloroethyl) ether complex and a tert-butyl chloride initiator;
wherein the propylene-derived olefin mixture comprises propylene dimer, propylene trimer, propylene tetramer, or any mixture thereof and wherein at least about 60% by weight of the total amount of propylene dimer, propylene trimer, and propylene tetramer in the propylene-derived olefin mixture is reacted to form the mixture of oligomers and wherein the formed mixture of oligomers comprises propylene oligomers comprising at least 15 carbons atoms; and
wherein the suitable conditions comprise a temperature of at least about 15° C. and a catalyst concentration of at least about 0.02 M based on aluminum concentration.

11. The process of embodiment 10 wherein the formed mixture of oligomers comprises propylene pentamers, propylene hexamers, propylene heptamers, propylene octamers, propylene nonamers, propylene decamers, or any mixture thereof.

12. The process of embodiment 10 and/or 11 wherein at least about 65% by weight of the total amount of propylene dimer, propylene trimer, and propylene tetramer in the propylene-derived olefin mixture is reacted to form the mixture of oligomers.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A process comprising:
providing a propylene-derived olefin mixture to a reactor; and
reacting the propylene-derived olefin mixture under suitable conditions to form a mixture of oligomers in the presence of a catalyst comprising alkyl aluminum halide complex;
wherein the propylene-derived olefin mixture comprises propylene dimer, propylene trimer, propylene tetramer, or any mixture thereof and wherein at least about 60% by weight of the total amount of propylene dimer, propylene trimer, and propylene tetramer in the propylene-derived olefin mixture is reacted to form the mixture of oligomers and wherein the formed mixture of oligomers comprises propylene oligomers comprising at least 15 carbons atoms.

2. The process of claim 1 wherein the propylene oligomers comprising at least 15 carbons atoms comprise propylene pentamers, propylene hexamers, propylene heptamers, propylene octamers, propylene nonamers, propylene decamers, or any mixture thereof.

3. The process of claim 1 wherein the alkyl aluminum halide complex comprises a $C_1$-$C_8$ alkyl group.

4. The process of claim 1 wherein the alkyl aluminum halide complex comprises an alkyl aluminum dihalide-bis-haloalkyl ether complex.

5. The process of claim 4 wherein the alkyl aluminum dihalide-bis-haloalkyl ether complex comprises ethyl aluminum dichloride bis(2-chloroethyl) ether complex.

6. The process of claim 1 which further comprises employing an oligomerization initiator.

7. The process of claim 6 wherein the oligomerization initiator comprises t-butyl chloride.

8. The process of claim 1 wherein the suitable conditions comprise a catalyst concentration of at least about 0.005 M up to about 0.05 M based on aluminum concentration, the presence of an oligomerization initiator, and a temperature of at least about 0° C.

9. The process of claim 8 wherein the temperature is at least about 10° C. and the catalyst concentration is at least about 0.02 M based on aluminum concentration, and the oligomerization initiator is tert-butyl chloride.

10. A process comprising:
providing a propylene-derived olefin mixture to a reactor; and
reacting the propylene-derived olefin mixture under suitable conditions to form a mixture of oligomers in the presence of a catalyst comprising an ethyl aluminum dichloride bis(2-chloroethyl) ether complex and a tert-butyl chloride initiator;
wherein the propylene-derived olefin mixture comprises propylene dimer, propylene trimer, propylene tetramer, or any mixture thereof and wherein at least about 60% by weight of the total amount of propylene dimer, propylene trimer, and propylene tetramer in the propylene-derived olefin mixture is reacted to form the mixture of oligomers and wherein the formed mixture of oligomers comprises propylene oligomers comprising at least 15 carbons atoms; and
wherein the suitable conditions comprise a temperature of at least about 15° C. and a catalyst concentration of at least about 0.02 M based on aluminum concentration.

11. The process of claim 10 wherein the formed mixture of oligomers comprises propylene pentamers, propylene hexamers, propylene heptamers, propylene octamers, propylene nonamers, propylene decamers, or any mixture thereof.

12. The process of claim 10 wherein at least about 65% by weight of the total amount of propylene dimer, propylene trimer, and propylene tetramer in the propylene-derived olefin mixture is reacted to form the mixture of oligomers.

* * * * *